United States Patent
Hamilton et al.

(10) Patent No.: US 6,347,968 B1
(45) Date of Patent: Feb. 19, 2002

(54) APPARATUS AND METHODS FOR PROVIDING AN ELECTRICAL CONNECTION BETWEEN A BORE COPPER AND FIELD WINDINGS OF A DYNAMOELECTRIC MACHINE

(75) Inventors: Robert Gerald Hamilton, Georgetown, MA (US); Leonard Paul Squillacioti, Saratoga Springs, NY (US); Ronald Joseph Zawoysky; Thomas Richard Blakelock, both of Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/741,160

(22) Filed: Dec. 21, 2000

(51) Int. Cl.⁷ .............................................. H01R 13/187
(52) U.S. Cl. ....................................... 439/843; 439/801
(58) Field of Search ................................. 439/843, 801

(56) References Cited

U.S. PATENT DOCUMENTS 5,358,432 A   10/1994   Shih et al. ................... 439/825
6,280,265 B1 *  8/2001   Hopeck et al. ............. 439/843

* cited by examiner

Primary Examiner—Tho Tho Ta
Assistant Examiner—Ann McCamey
(74) Attorney, Agent, or Firm—Nixon & Vanderhye

(57) ABSTRACT

A generator has a bore connector having a threaded radial opening for receiving a sectional terminal stud. The terminal stud includes an adapter section having threads on a radial inner end thereof for threaded engagement with the bore copper and a recess at its opposite end. An outer section of the terminal stud is received in the recess, making electrical connection therewith through an electrical connector. The outer section is maintained in the radial bore of the rotor by a threaded nut. The rotational orientation of the adapter section is fixed by its threaded engagement with the bore copper, while the outer section can be inserted without regard to rotational orientation, thereby facilitating refurbishment of the generator without remachining the bore copper.

7 Claims, 3 Drawing Sheets

US 6,347,968 B1

APPARATUS AND METHODS FOR PROVIDING AN ELECTRICAL CONNECTION BETWEEN A BORE COPPER AND FIELD WINDINGS OF A DYNAMOELECTRIC MACHINE

BACKGROUND OF THE INVENTION

The present invention relates to connections between and methods of connecting field windings and exciter or slip rings in dynamoelectric machines and particularly relates to a sectional terminal stud for electrically interconnecting a bore copper and field windings.

The rotors of dynamoelectric machines typically comprise relatively large diameter cylindrical bodies containing field windings for producing magnetic flux which in turn produces stator current and voltage. These field windings are normally carried in a series of longitudinal slots along the outer circumference and extend the length of the rotor body. Rotation of the body particularly at speeds of 3600 rpm, for example, exerts high centrifugal forces on the windings. These windings are conventionally retained in the rotor slots through the use of dovetail shaped wedges which also extend along the length of the rotor body. The manner in which the windings and rotor slots are shaped, insulated and cooled present formidable design problems, particularly for units designed for long term operation under variable load and environmental conditions. Because the windings extend axially beyond the rotor body and wedge ends and are subjected to the same rotational forces which tend to thrust the winding end turns in a radially outward direction, specially designed structure must be included to prevent such radial movement, as well as for making electrical connections between the exciter or slip rings and the windings.

As to the problem of preventing radial movement of the end turns, it is conventional to enclose the winding end turns within retaining rings attached to the rotor body ends by shrink fitting such rings around circumferential lips at the ends of the rotor body. Other means, such as locking keys and the like, are additionally included to maintain the retaining rings securely on the rotor so as to counteract the effects of thermal expansion on the retaining rings.

As to the manner in which electrical connections may be made between the field windings and bore connectors, also known as the "bore copper" (insulated conductors embedded in small diameter shafts that extend from opposite ends of the rotor body for electrical connection with the exciter/rectifier assembly), such field winding connections as found in the prior art conventionally utilize brazed leaves of copper bent to various configurations. These configurations have exhibited premature failures due to cyclic mechanical and electrical duty requirements, which require the connectors to have particular characteristics.

More particularly, in a current long-standing design affording electrical connection between a field winding and a bore conductor (see, for example, U.S. Pat. No. 5,358,432), a main terminal is inserted into a radial bore of the shaft. The main terminal has tapered threads at its radial inner end for engaging female tapered threads in the bore connector. Tolerances of the taper angle, thread pitch, the contacts along minimum major and minor threaded diameters and the need to torque the main terminal to a predetermined value render the installation of the main terminal to bore connector connection difficult as well as affording less than optimal conditions for good electrical connection. The opposite end of the main terminal includes a plurality of flexible leaves which are electrically connected to the field winding. Because of the pipe thread type securement between the main terminal and bore connector, the thin terminal leaves are necessarily formed and brazed together in the field. In that process, care must be taken not to melt the necessary thin copper leaves or to allow the brazing alloy to migrate into the flexible part of the terminal. Field brazing of the leaves to one another and to the field winding is time consuming and laborious. Should the leaves melt in the course of brazing or should braze alloy migrate to the flexible part of the terminal, the high rotational and thermal forces of the rotor will cause the flexible connection to prematurely fail causing unscheduled outages and generator down time.

In a prior application of assignee hereof, an improved terminal stud connector between the bore copper and field winding is disclosed. In that invention, the radially open threaded aperture of the bore copper is machined to remove the threads and receive an annular spring-like electrical connector for receiving and making electrical contact with the radial inner end of the terminal stud. While that arrangement is satisfactory for new generators, older generators undergoing retrofit in the field require the complete removal and remanufacture of the bore copper embedded in the center of the rotor in order to utilize the improved terminal connector of that application. Because it is not economical to remove and remanufacture the bore connector in order to retrofit such terminal stud, there is a need to improve the connection between the bore copper and field windings for original equipment as well as in a manner rendering the repair and refurbishment of generators in the field and in this generator location more economical, practical and more speedily effected.

BRIEF SUMMARY OF THE INVENTION

In accordance with a preferred embodiment of the present invention, there is provided a method and apparatus for repairing generators in the field without the need for remanufacturing and/or removal of the bore connector from the center of the rotor. To accomplish the foregoing, a preferred form of the present invention provides a sectional terminal stud including a radially inner terminal stud adapter section and an outer terminal stud section. The adapter section has on its radially inner end a radially inner, male threaded portion to match the female threaded portion of the existing bore copper whereby the terminal stud adapter can be readily threaded into the bore copper in the field. The opposite end of the adapter section includes a recess for receiving an annular spring-like electrical connector. The outer section includes a radial inner end receivable in the recess within the annular spring and which spring affords good electrical connection between the outer and adapter sections of the terminal stud. The opposite end of the outer section includes the leaf copper for connection to the field windings.

It will be appreciated that a principal difficulty with replacing a terminal stud where the terminal stud is screwthreaded into the bore copper is the necessity to orient the terminal stud about its axis so that the leaf copper on the outer end of the stud is oriented relative to the axial centerline of the machine. In other words, by using a threaded connection between the terminal stud and the bore copper, the resulting rotational orientation of the terminal stud is problematic. To cure that problem, the leaf copper was typically applied to the terminal stud but left unformed and unattached to the windings until it was assembled into the bore copper and a specific torque was applied to secure the terminal stud and bore copper to one another. The leaf copper was then formed to fit the coil, and the stud was over or under-torqued to achieve alignment. However, it has been found that such over-torque or under-torque leads to premature failures and, because of this type of connection, the leaf copper was subjected to low-cycle fatigue mechanism. Consequently, by forming a terminal stud of two sections with the radially inner adapter section screwthreaded into the bore copper and without requiring rotational orientation of the outer section relative to the adapter section, the leaf copper can be formed on the outer section of the terminal stud prior to installation. In this manner, the outer section and the leaf copper secured thereto can simply be rotated for alignment with the machine and the field windings.

In a preferred embodiment according to the present invention, there is provided in a dynamoelectric machine having a rotor, a radial bore in the rotor, a bore connector extending generally in an axial direction along a portion of the rotor and having a generally radially outwardly opening threaded aperture, a terminal stud in the radial bore for electrically connecting the bore connector and field windings of the machine and including an adapter section and an outer section, the adapter section having a threaded end portion for threaded engagement with the bore connector in the threaded aperture thereof, an opposite end of the adapter section having a recess, the outer section having an electrical contact portion at one end thereof for electrical connection with the adapter portion, a multi-contact electrical connector in the recess for electrically coupling the sections to one another, the sections being axially aligned with one another with the electrical contact portion of the outer section received in the recess without rotational orientation of the outer section, the outer section having a leaf copper at an opposite end thereof for engaging the field windings of the machine whereby the outer section is assembled to the adapter section without regard to the rotational orientation of the adapter section relative to the bore connector caused by the threaded connection between the adapter section and bore connector.

In a further preferred embodiment according to the present invention, there is provided in a dynamoelectric machine having a rotor and a radial bore in the rotor, a bore connector extending generally in an axial direction along a portion of the rotor and having a generally radially outwardly opening aperture and a terminal stud including an adapter section and an outer section, a method of connecting the bore connector and a field winding, comprising the steps of (a) screwthreading a threaded end of the adapter section of the terminal stud into the radially outwardly opening aperture of the bore connector, (b) inserting one end portion of the outer section of the terminal stud into a recess formed on the opposite end of the adapter section from the threaded end to effect an electrical contact between the adapter section and the outer section and (c) securing leaf copper on an opposite end of the outer section to the field winding.

DETAILED DESCRIPTION OF THE INVENTION

Figure 1:
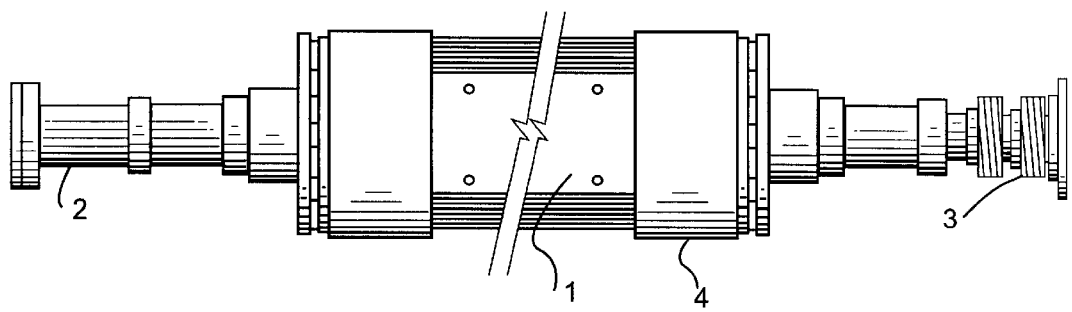
FIG. 1 is a schematic illustration of a conventional rotor for a dynamoelectric machine.

Referring to the drawings, particularly FIG. 1, there is illustrated a rotor 1 for a dynamoelectric machine such as a generator. The rotor 1 includes end shafts 2 which contains insulated conductors, i.e., bore connectors or "bore copper" which extend longitudinally along the end shafts 2 between the exciter/slip rings 3 and the rotor field windings located on the rotor within the retaining rings 4. As will be appreciated and is conventional, the rotor includes a series of longitudinally extending, radially-opening slots, not shown, having dovetail-shaped, longitudinal grooves in the slot sides adjacent the periphery of the rotor. Field windings are inserted in the slots and extend the length of the rotor body with longitudinal wedges, not shown, located in the dovetail-shaped grooves for holding the windings in place against centrifugal forces exerted when the rotor is at operational speed. The longitudinal sections of the windings extend in an axial direction beyond the ends of the larger diameter portion of the rotor and include end turns 7 (FIG. 2) for connecting a longitudinal section of one slot with a winding of another slot. The retaining ring 4 overlies these end turns and resists the centrifugal forces on the winding end turns when the rotor is at operational speed so as to restrain the end turns from moving in a radially-outwardly direction.

Figure 2:
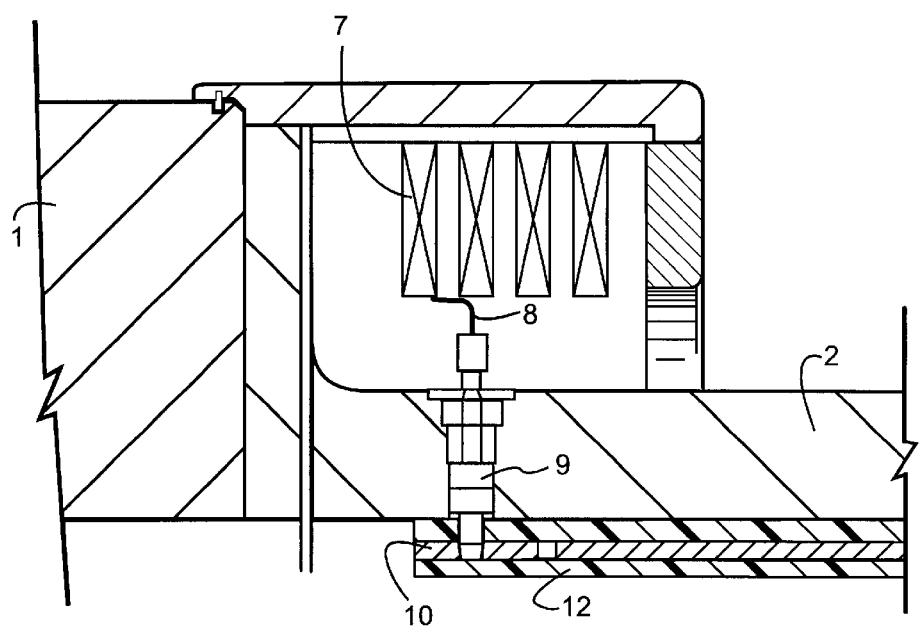
FIG. 2 is a fragmentary cross-sectional view of a prior art connection between the terminal stud and a bore copper.

Referring to FIG. 2, a terminal stud 9 extends between a bore copper 10 and the field windings 7. A flexible lead connector 8 typically connects the radial outer end of the terminal stud 9 to an end turn 7. It will be appreciated that the bore copper 10 is electrically insulated from the rotor 2, for example, by insulation 12. Likewise, the terminal stud, while conducting electricity between the bore copper 10 and windings 7, is likewise electrically insulated from the rotor 1 in a conventional manner. It will be appreciated that in the illustration of FIG. 2, the radial opening in the bore copper 10 which receives the lower or inner end of the terminal stud is a tapered, threaded aperture which receives complementary threads on the end of the terminal stud. Consequently, the rotational orientation of the terminal stud relative to the bore copper is fixed by the nature of the threads. As previously indicated, the alignment of the flexible lead connectors 8, i.e., lead copper, with the machine axis and end turns is thus problematical.

Figure 3:
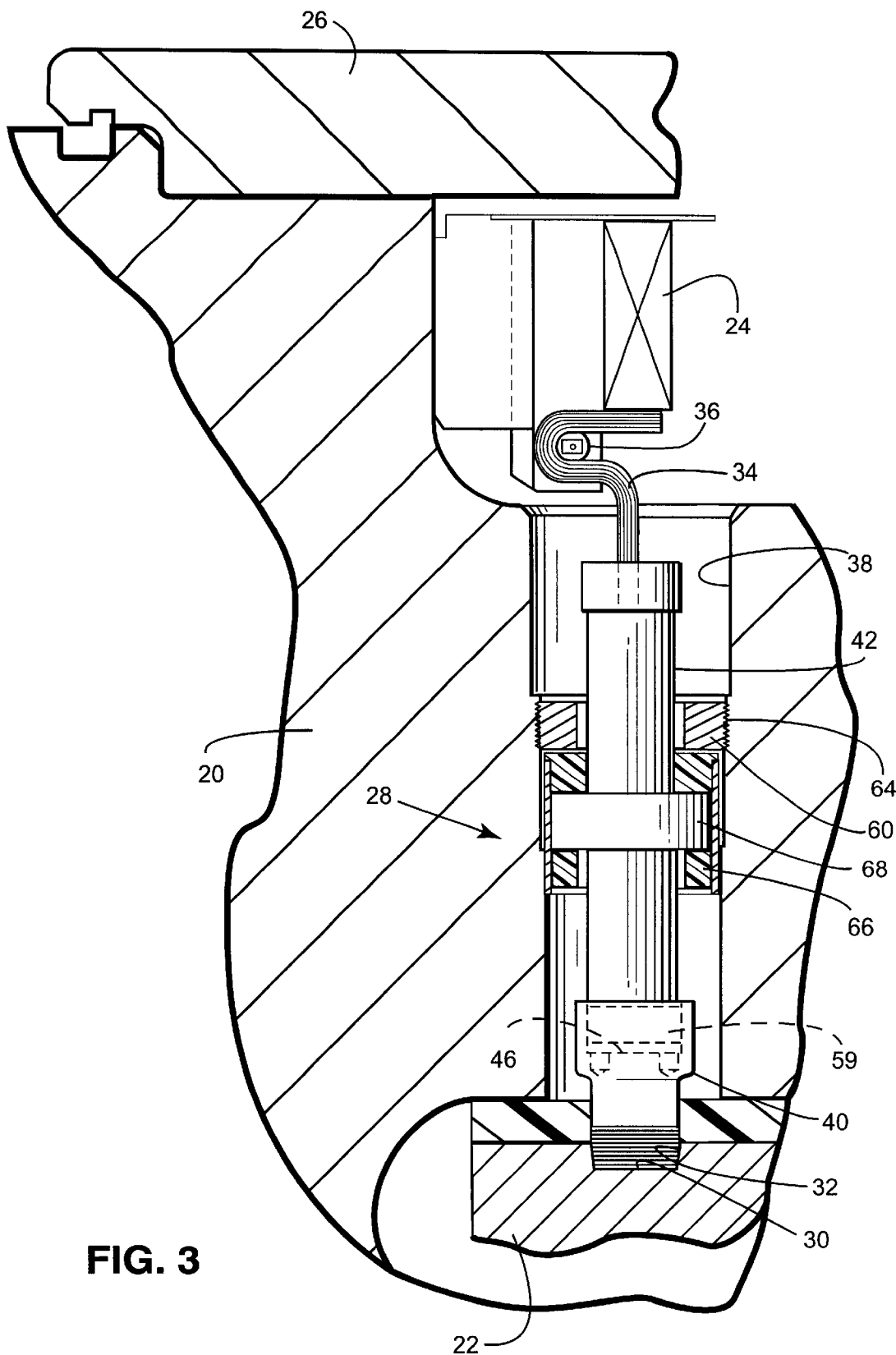
FIG. 3 is a fragmentary enlarged cross-sectional view illustrating an electrical connection between the bore copper and field windings of a dynamoelectric machine in accordance with a preferred embodiment of the present invention.

Referring now to FIG. 3, there is illustrated a generator rotor 20, a bore copper 22 extending generally parallel to the axis of the rotor 20, end turns 24, a retaining ring 26 and a terminal stud, generally designated 28 and constructed in accordance with a preferred embodiment of the present invention, electrically interconnecting the bore copper 22 and the end turns 24. As illustrated, the bore copper 22 has a radially opening aperture 30 containing a tapered thread 32. Similarly as in existing generators, the terminal stud 28 is screwthreaded into the bore copper 22 and has a shaped leaf connector 34, i.e., leaf copper, for electrically connecting with end turns 24. As well known, the leaf connector 34 comprises a plurality of leaves of copper brazed at opposite ends but loose between opposite ends and, in this instance, the leaf connector 34 is turned about a pin support 36.

Figure 4:
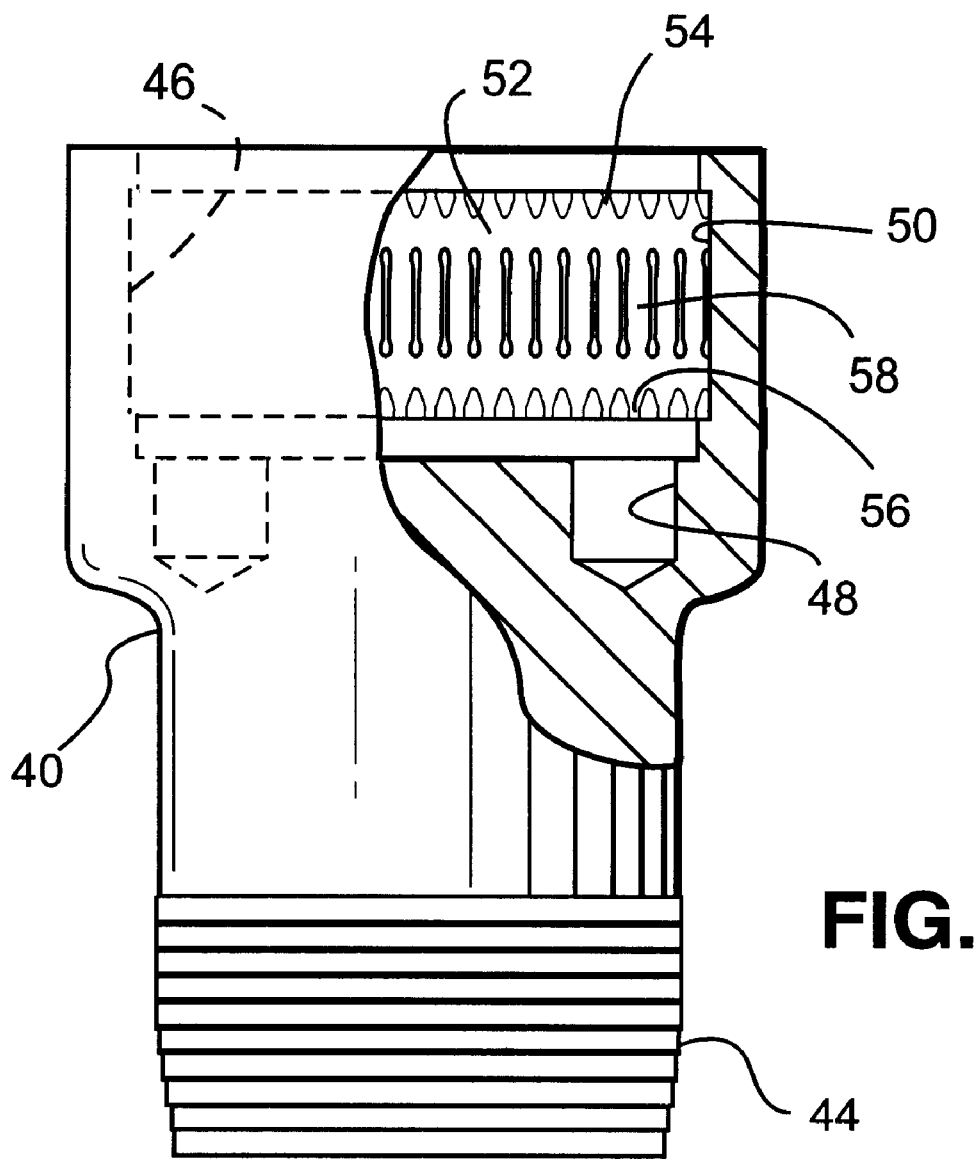
FIG. 4 is an enlarged side elevational view with portions broken out and in cross-section of an adapter section forming part of the terminal stud hereof.

In order to provide a terminal stud which does not involve rotational orientation in the radial bore 38 of rotor 20, the terminal stud 28 hereof is formed of a radial inner adapter section 40 and an outer section 42. The adapter system as best illustrated in FIG. 4 includes the tapered male threads 44 on the radially innermost end thereof for threaded engagement with the female threads 32 of the bore copper 22. The radial outer end of the adapter section 40 is diametrically enlarged (see FIG. 4) to provide a recess 46 opening radially outwardly. The base of the recess includes a pair of openings 48 for receiving the projections on the end of a tool, not shown, whereby the adapter section 40 can be screwthreaded into the bore copper 22. The recess 46 includes an enlarged diameter section 50 for receiving a springbiased multi-contact connection strip or electrical connector 52. The multi-contact connection strip 52 is commercially available and comprises an electrical connector having marginal or peripheral bands 54 and 56 with spring louvers 58 therebetween. The margins 54 and 56 extend radially inwardly of the recess 46 for purposes of forming an electrical connection with the radially inner end of the outer terminal stud section 42. The electrical connector 52 is retained within the enlarged recess 50 and the spring louvers 58 form an electrical connection with the adapter section 40.

The outer section is sized at its radially inner end portion 59 for reception in the recess 46 and electrical contact with the electrical connector 52. It will be appreciated that the inner end portion 59 of the outer section 42 is inserted into the recess 56 without regard to the rotational orientation of the outer section 42 about the axis of the terminal stud 28 and makes electrical contact with connector 52. That is, adapter section 40, because of its threaded engagement with the threaded bore 32 of bore copper 22, has a particular rotational orientation when torqued down for securement to the bore copper 22. In contrast, the outer section 42 can be electrically connected to the adapter section 40 in any rotational orientation about its axis. It will be appreciated that the leaf copper 34 may be formed on the upper end of the terminal stud prior to its installation into the radial bore 38. Consequently, the outer section 42 can be rotationally oriented to align the leaf connector 34 with the axis of the machine, or any other desired direction, without regard to any rotational orientation with respect to its adapter section 40.

The outer section 42 is retained in the radial bore by a retainer or nut 60 having external threads 64. The external threads 64 engage female threads on the radial bore 38. The outer section 42 in the region of the nut 60 is electrically insulated from the nut. Additionally, annular insulators 66 are provided on opposite sides of the enlarged intermediate portion 68 of the outer section 42. Consequently, when the outer section is inserted into the radial bore 38 and the nut 60 is threaded to engage the threaded portion of the bore, the outer section 42 is maintained in the radial bore 38 in electrical contact with the adapter section 40 and electrically insulated from the rotor.

It will be appreciated that with the foregoing arrangement, generators in service in the field and having the female tapered threads of the bore connector can be readily refurbished without remanufacturing the bore connector itself. Upon removal of the conventional terminal stud by unthreading the stud from the bore connector and removing it from the radial bore 38, the adapter section 40, together with the electrical connector 52 in recess 46, can be inserted into bore 38. The adapter section 40 is then screwthreaded to the bore copper 22. Once screwthreaded in place, the radial inner end of the outer section 42 can be inserted into the recess 56 and the outer section 42 is rotated to rotationally align the leaf connector 34 with the axis of the machine.

By threading nut 60 in the bore 38, the outer section 40 is secured within the bore and its electrical contact with the adapter section 40 and the field windings is maintained. Consequently, the terminal stud can be retrofitted into the rotor without remanufacture or machining of the existing bore copper and particularly the tapered threaded aperture 32.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a dynamoelectric machine having a rotor, a radial bore in said rotor, and a bore connector extending generally in an axial direction along a portion of said rotor and having a generally radially outwardly opening threaded aperture, apparatus for electrically connecting said bore connector and field windings of the machine comprising a terminal stud including an adapter section and an outer section, said adapter section having a threaded end portion for threaded engagement with said bore connector in said threaded aperture thereof, an opposite end of said adapter section having a recess, said outer section having an electrical contact portion at one end thereof for electrical connection with said adapter portion, a multi-contact electrical connector in said recess for electrically coupling said sections to one another, said sections being axially aligned with one another with said electrical contact portion of said outer section received in said recess without rotational orientation of said outer section, said outer section having a leaf copper at an opposite end thereof for engaging the field windings of said machine whereby the outer section is assembled to the adapter section without regard to the rotational orientation of the adapter section relative to the bore connector caused by the threaded connection between the adapter section and bore connector.

2. Apparatus according to claim 1 including a retainer engaging a shoulder on said terminal stud and threadedly engaged with said rotor.

3. Apparatus according to claim 1 including electrical insulation about portions of said outer terminal stud section electrically insulating said rotor and said terminal stud relative to one another.

4. In a dynamoelectric machine having a rotor and a radial bore in the rotor, a bore connector extending generally in an axial direction along a portion of said rotor and having a generally radially outwardly opening aperture and a terminal stud, a method of connecting the bore connector and a field winding, comprising the steps of:

(a) screwthreading a threaded end of an adapter section of the terminal stud into the radially outwardly opening aperture of the bore connector;

(b) inserting one end portion of an outer section of said terminal stud into a recess formed on the opposite end of said adapter section from said threaded end to effect an electrical contact between said adapter section and said outer section; and (c) securing leaf copper on an opposite end of the outer section to the field winding.

5. A method according to claim 4 including disposing an annular spring within said recess and engaging said spring with said one end of said outer section and walls of said recess to form an electrical connection between said outer section and said adapter section.

6. A method according to claim 4, including prior to step (a) removing a terminal stud adapter screwthreaded into the bore connector and subsequent thereto, retrofitting said outer section and said adapter section in said radial bore in accordance with steps (a), (b) and (c).

7. A method according to claim 4 wherein step (b) is performed without regard to the rotational orientation of the outer section relative to the adapter section.

\* \* \* \* \*